United States Patent
Wilen

(10) Patent No.: US 8,727,212 B2
(45) Date of Patent: May 20, 2014

(54) EMBOSSING PATTERN CARD SECURITY SYSTEM

(71) Applicant: WILopEN Products LC, Deerfield Beach, FL (US)

(72) Inventor: Richard Wilen, Boca Raton, FL (US)

(73) Assignee: WILopEN Products, LC, Deerfield Beach, FL (US)

( * ) Notice: Subject to any disclaimer, the term of this patent is extended or adjusted under 35 U.S.C. 154(b) by 0 days.

(21) Appl. No.: 13/839,314

(22) Filed: Mar. 15, 2013

(65) Prior Publication Data

US 2013/0269550 A1 Oct. 17, 2013

Related U.S. Application Data

(63) Continuation-in-part of application No. 11/351,658, filed on Feb. 10, 2006, and a continuation-in-part of application No. 12/464,740, filed on May 12, 2009, and a continuation-in-part of application No. 12/846,834, filed on Jul. 30, 2010.

(51) Int. Cl.
*G06K 5/00* (2006.01)

(52) U.S. Cl.
USPC .......................... 235/380; 235/375; 235/487

(58) Field of Classification Search
USPC .......................... 235/380, 375, 487, 451, 492
See application file for complete search history.

(56) References Cited

U.S. PATENT DOCUMENTS

| | | | |
|---|---|---|---|
| 4,943,093 A | | 7/1990 | Melling |
| 5,174,608 A | * | 12/1992 | Benardelli ............... 283/81 |
| 5,447,335 A | * | 9/1995 | Haslop ............... 283/91 |
| 8,137,899 B1 | * | 3/2012 | Muller et al. ............... 430/320 |
| 2004/0247841 A1 | * | 12/2004 | Fischer et al. ............... 428/195.1 |
| 2006/0017957 A1 | | 1/2006 | Degott |
| 2006/0108412 A1 | * | 5/2006 | Okamoto et al. ............... 235/379 |
| 2007/0165209 A1 | | 7/2007 | Natan |
| 2007/0211238 A1 | * | 9/2007 | Hoffmuller et al. ............... 356/71 |
| 2007/0246933 A1 | * | 10/2007 | Heim et al. ............... 283/98 |
| 2008/0145620 A1 | * | 6/2008 | Sahlberg et al. ............... 428/172 |
| 2010/0027851 A1 | | 2/2010 | Walther |
| 2011/0087400 A1 | | 4/2011 | Lorimier |
| 2013/0271546 A1 | | 10/2013 | Wilen |

\* cited by examiner

*Primary Examiner* — Edwyn Labaze
(74) *Attorney, Agent, or Firm* — Johnson & Martin, P.A.; James David Johnson

(57) ABSTRACT

A system for securing a card or paper with a printing component to print an image and an embossing component to emboss a pattern to emboss an impression at a configurable place on the paper. An embossing die may include a pattern to make the impression. The impression is correlative with the image to indicate a likelihood of authenticity. Multiple cards are includable on paper to be securable by the system. The image may include a code corresponding with a value usable with a merchant. A method to secure a card or paper is disclosed.

23 Claims, 8 Drawing Sheets

EMBOSSING PATTERN CARD SECURITY SYSTEM

RELATED APPLICATION INFORMATION

This is a continuation-in-part application and claims the benefit of U.S. Nonprovisional patent application Ser. No. 11/351,658 filed Feb. 10, 2006 and U.S. Nonprovisional patent application Ser. No. 12/464,740 filed May 12, 2009, which is a nonprovisional of U.S. Provisional Patent Application Ser. No. 61/052,377 filed May 12, 2008. The entire contents of the above mentioned patent application documents are hereby incorporated by reference as if fully set forth herein.

FIELD OF THE INVENTION

The invention relates to securing and authenticating papers. More particularly, the invention relates to authenticating cards includable on papers to avert unauthorized reproduction.

BACKGROUND

Papers and documents are often subject to unauthorized and fraudulent reproduction. This fraudulent reproduction is especially unwanted when the paper being reproduced includes a code or indicia that grants its bearer some value, such as a discount or credit with a merchant. The importance of security for papers that deals with money transfers is great.

With photocopiers, scanners, and printers becoming more commonly accessible, there is little to stop a person from reproducing a card or paper with inadequate security measures. Without these protections, both the consumer and the merchants may feel uncomfortable using papers that hold a value. In this instance, comfort is provided by assurance that monies are transferred into proper accounts, accounted for properly and reporting of the funds movement is available as needed.

What is needed is a system to secure papers. Also, a system is needed that may produce papers that can be quickly and accurately authenticated by a consumer, merchant, or other individual. Furthermore, a system is needed that can easily produce a secured paper, which can then be comfortably used in commerce.

SUMMARY

According to embodiments of the present invention, an embossing pattern card security system is described that may provide security for paper. The system of the present invention may also enable a consumer, merchant, or other individual to quickly and accurately assess the authenticity of the document. Furthermore, the system of the present invention may easily produce a secured paper, which can then be comfortably used in commerce.

In one aspect, a system is provided having a printing component and an embossing component for securing paper. The printing component may print an image on the paper. The image is configurable. The embossing component is configurable with a pattern to emboss an impression on the paper. The pattern may be provided by an embossing die. The impression is correlative with the image to indicate a likelihood of authenticity.

In one aspect, the printing component and the embossing component are includable in a press to print the image and emboss the impression in an approximately continuous operation.

In one aspect, the embossing component is configurable to vary a place the impression is embossed on the paper. In another aspect, the image and the impression are locatable at an approximately adjacent to the places.

In one aspect, the paper may include a card. The impression is locatable at least partially on the card. Similarly, the image is also locatable at least partially on the card. In another aspect, the image may include a code corresponding with a value usable with a merchant.

In one aspect, the paper may include a plurality of cards. The image is includable on each card of the plurality of cards. Similarly, the impression is also includable on each card of the plurality of cards. In another aspect, the pattern of the impression is configurable to differ among each card on the paper, the impression being locatable on each card.

A method is provided for securing paper using a system with a printing component and an embossing component. The method may include printing a configurable image to the paper. A code may be included in the image corresponding with a value usable with a merchant. The method also may include embossing an impression of a configurable pattern from an embossing die to the paper. The impression may be correlative with the image to indicate a likeliness of authenticity.

In one aspect, the printing component and the embossing component are included in a press to print the image and emboss the impression in one significantly continuous operation.

In one aspect, the method may further include selecting a place on the paper to make the impression and the image. The impression is positionable approximately adjacent to the image on the paper. In another aspect, the paper may include a card. The impression and the image are locatable at least partially on the card.

Additional cards are includable on the paper. The image is includable on the at least one of the additional cards. Similarly, the impression is includable on at least one of the additional cards. The impression is selectable to differ between the card and at least one of the additional cards. Similarly, the image is selectable to differ between the card and at least one of the additional cards.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
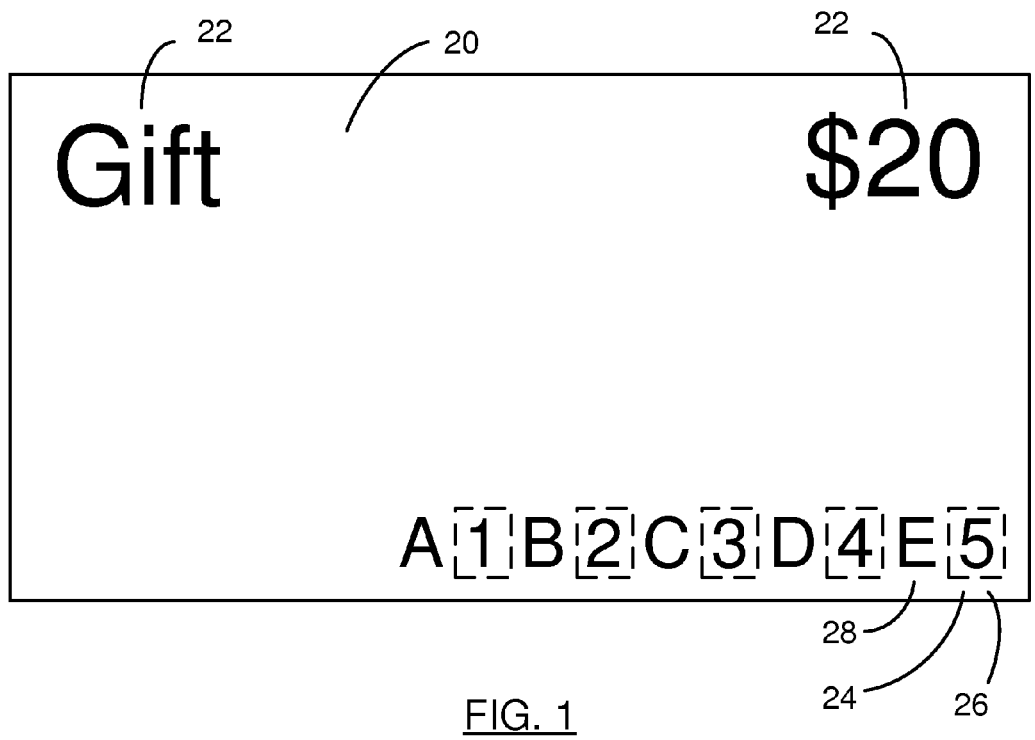
FIG. 1 is a top plan view of a card with security, according to an embodiment of the present invention.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings. In the following description, a system for securing paper will be discussed. Those of skill in the art will appreciate alternative labeling of the system as a security system, authentication system, the invention, or other similar names. Skilled readers should not view the inclusion of any alternative labels as limiting in any way.

In this disclosure, security can be subdivided into several areas that can affect a user's sense of security, and thus comfort. The system of the present invention may include several measures of security included in the system that reflect best practices. These security practices may be used to assist in the authentication of papers, such as printed non-activated direct mail gift cards. Various examples are provided below in the context of gift cards, or more generally, cards. Such examples are provided in the interest of clarity, and should not be read to limit the present invention solely to card-based embodiments.

Referring now to FIG. 1, a card 20 producible by the system will now be discussed. The card 20 may be included on a paper 40, which will be discussed in greater detail below along with FIG. 5. Throughout this disclosure, a card 20 may be discussed for clarity. The card 20, along with other cards 20, may be included on the paper 40, which may be printed and/or embossed by the system. The system may print individual cards 20, papers 40, papers including a number of cards 20, documents, and/or other printable media. Also, paper is defined to include a felted sheet of usually vegetable fibers laid down on a fine screen from water suspension. Paper is also defined herein to include a similar sheet of other material, which may include synthetic materials such as plastics. Those of skill in the art will appreciate other sheet or media that may be printed or embossed as included in the definition of paper 40 used throughout this disclosure.

One or more images 22 may be printed on the card 20. Examples of images 22 are illustrated in FIG. 1, which include a label "Gift" in the upper left area of the card 20, a stated value "$20" in the upper right area of the card 20, and a redemption code illustrated at the bottom area of the card 20. In addition to the image 22, one or more impressions 24 may be included on the card 20. Examples of impressions 24 may include raised characters 26, represented by the characters being included in broken line boxes illustrated in FIG. 1. The card 20 may include a combination of raised characters 26 and flat characters 28, which may be used to help authenticate the card 20. As illustrated, the characters may alternate between being raised 26 and flat 28.

Figure 2:
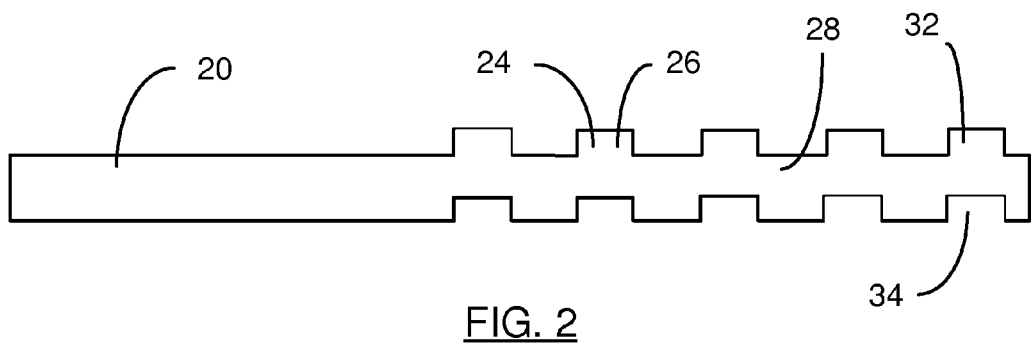
FIG. 2 is a front elevation view of the card of FIG. 1.

The impressions 24 included on the card 20 may be best understood by additionally viewing FIG. 2. The impressions 24 may be formed by embossing, or by raising a portion of a surface to a higher level. The portion of the surface may be raised to a higher level 32 by pressing an embossing die into the paper 40. After the embossing die has been pressed into the paper 40, the surface receiving the embossing die may include portions with a pattern pressed into the paper 40, as may be best illustrated by the debossed region 34.

The portions of the surface that have been raised may correspond with raised characters 26. Conversely, the portions of the surface that have not been raised may correspond with flat characters 28. The arrangement of raised characters 26 and flat characters 28 may be used to increase the security of the card 20 on which the characters are printed.

Figure 3:
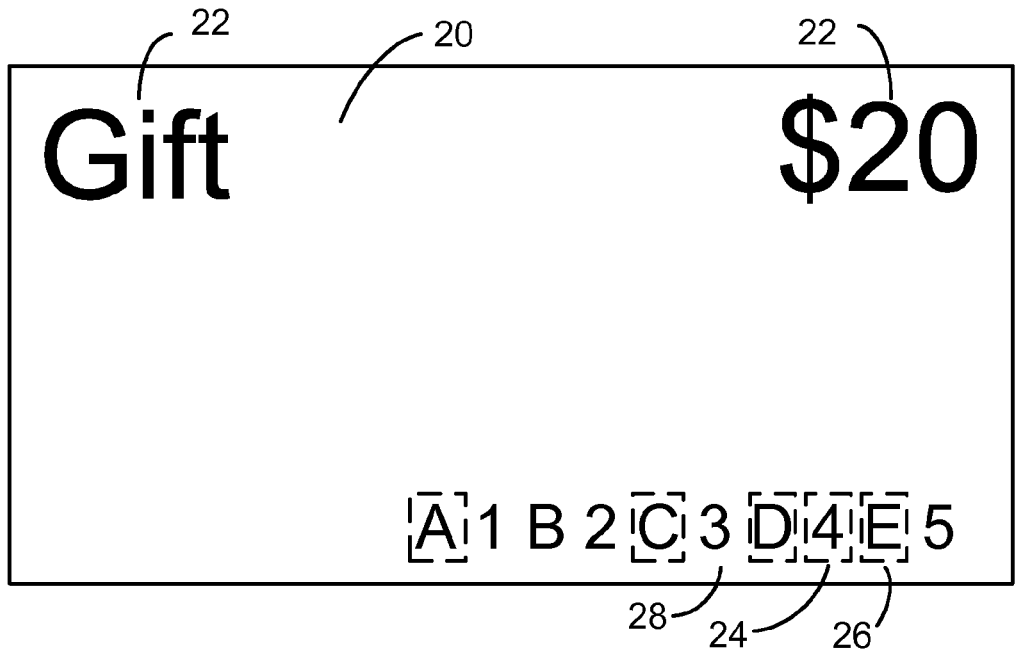
FIGS. 3-4 are top plan views of alternate embodiments of the card of FIG. 1.

Referring now to FIG. 3, an alternate embodiment of the card 20 will now be discussed. In this embodiment, the characters may be selected between being raised and flat with an irregular pattern. The irregular pattern may be predetermined, randomly generated, the product of a calculation or algorithm, or otherwise determined in a way that would be apparent to skilled artisans. The inclusion of printed images 22 may be similar to the discussion above for FIG. 1.

Figure 4:
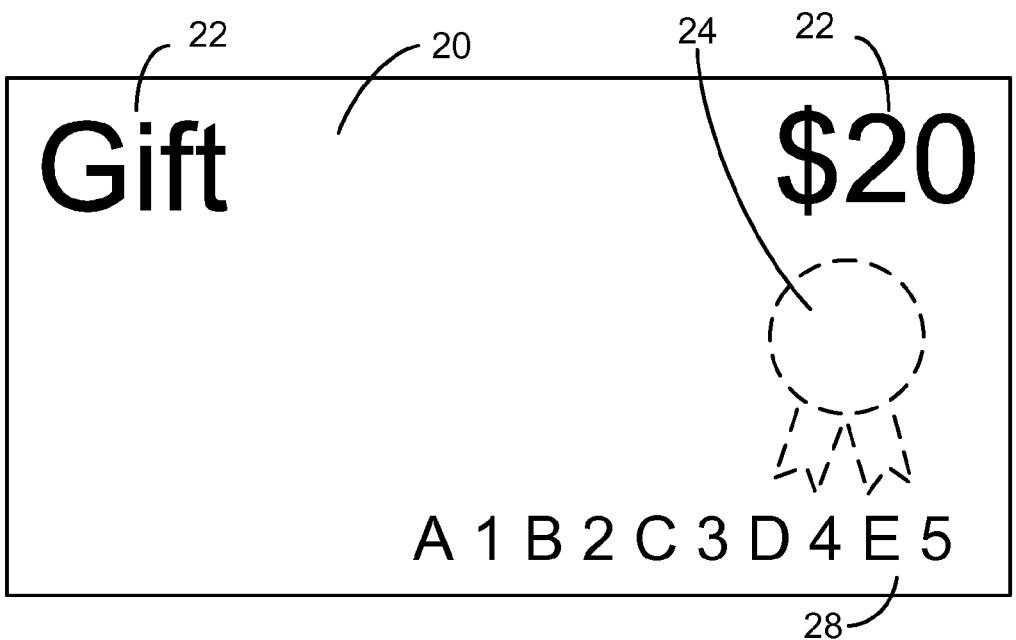

Referring now to FIG. 4, an additional embodiment of the card 20 will be discussed. In this embodiment, an impression 24 may be included that is at least partially separated from the characters of the image 22. All or some of the characters may be represented by flat characters 28. For example, an impression 24 may be embossed into a portion of the card 20 apart from characters, and may optionally indicate a code for a redeemable value. Skilled artisans will appreciate additional embodiments of a card 20 or paper 40 including a combination of one or more image 22 and impression 24 as being included within this description without limitation. Skilled artisans will also appreciate additional locations, patterns, and configurations of images 22 and impressions 24 after having the benefit of this disclosure. The inclusion of printed images 22 may be similar to the discussion above for FIG. 1.

The card 20 may indicate impression 24 patterns that should be expected by a user, such as a consumer and/or merchant. For example, the card 20 illustrated in FIG. 1 may include a message stating, "All numeric characters should be raised if authentic." The instructions may be included in the image 22 printed to the card 20. Additionally, the location of the impression 24 may be varied between papers 40 and cards 20. A message may be included on the card 20 to indicate the expected location of the impression 24. Alternatively, users may be trained to anticipate valid locations for the image 22 and/or impression 24.

Figure 5:
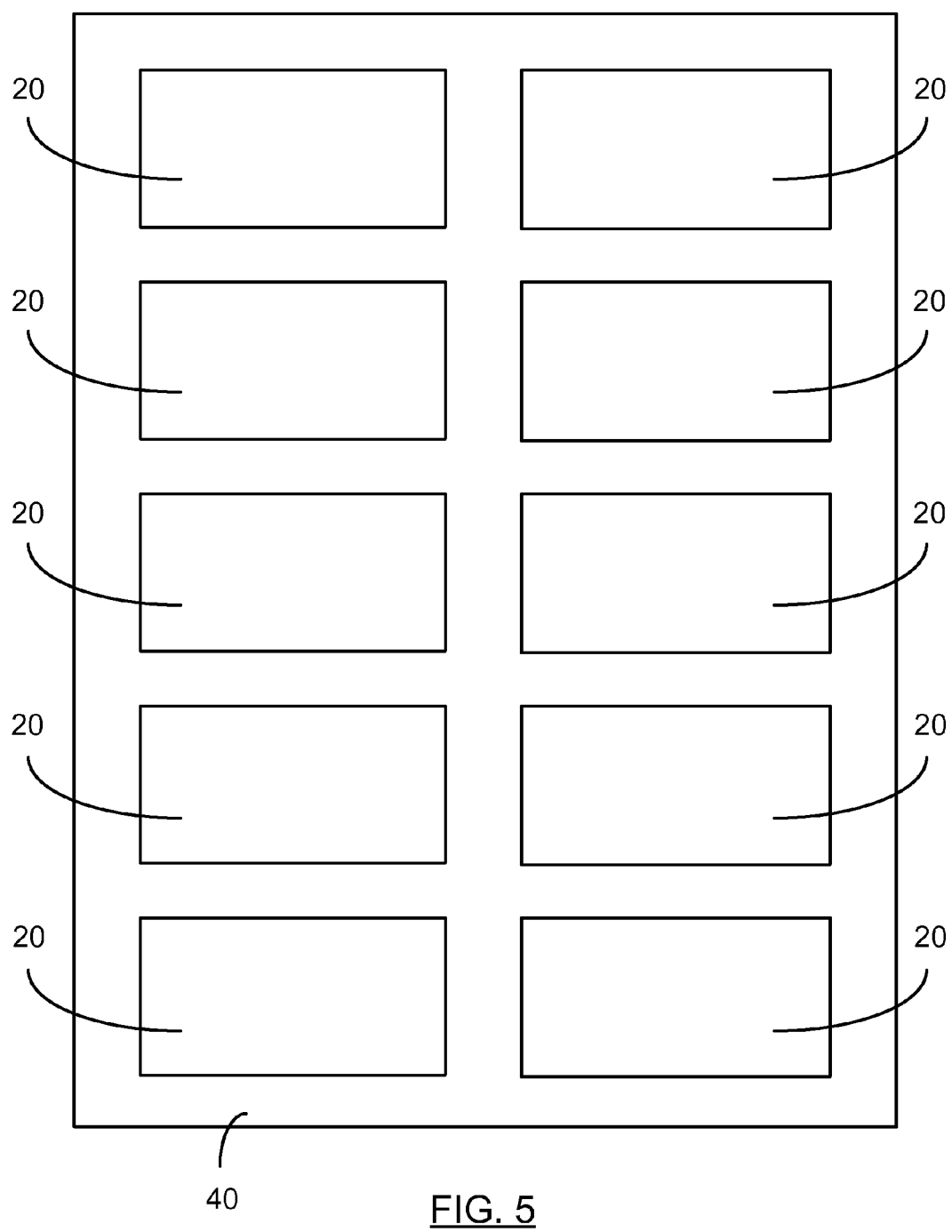
FIG. 5 is a top plan view of a paper with a plurality of cards, according to an embodiment of the present invention.

Referring now to FIG. 5, the paper 40 will be described in greater detail. As shown, the paper 40 may include a plurality of cards 20. The cards 20 may be configured in a rectangular array on the paper 40, or some other array that would be apparent to a skilled artisan. The cards 20 may be detachable from the paper 40 by using a cutting, perforating, or other separating. Alternatively, consistent with at least FIGS. 1-4, images 22 and impressions 24 may be included on the paper 40 without the intent of partitioning the paper 40 into smaller pieces, such as cards 20. By including multiple cards 20 on sheet of paper 40, the cards 20 may be printed with increased speed and efficiency. However, skilled artisans will appreciate that cards 20 may be printed and embossed without being initially included on paper 40.

Figure 6:
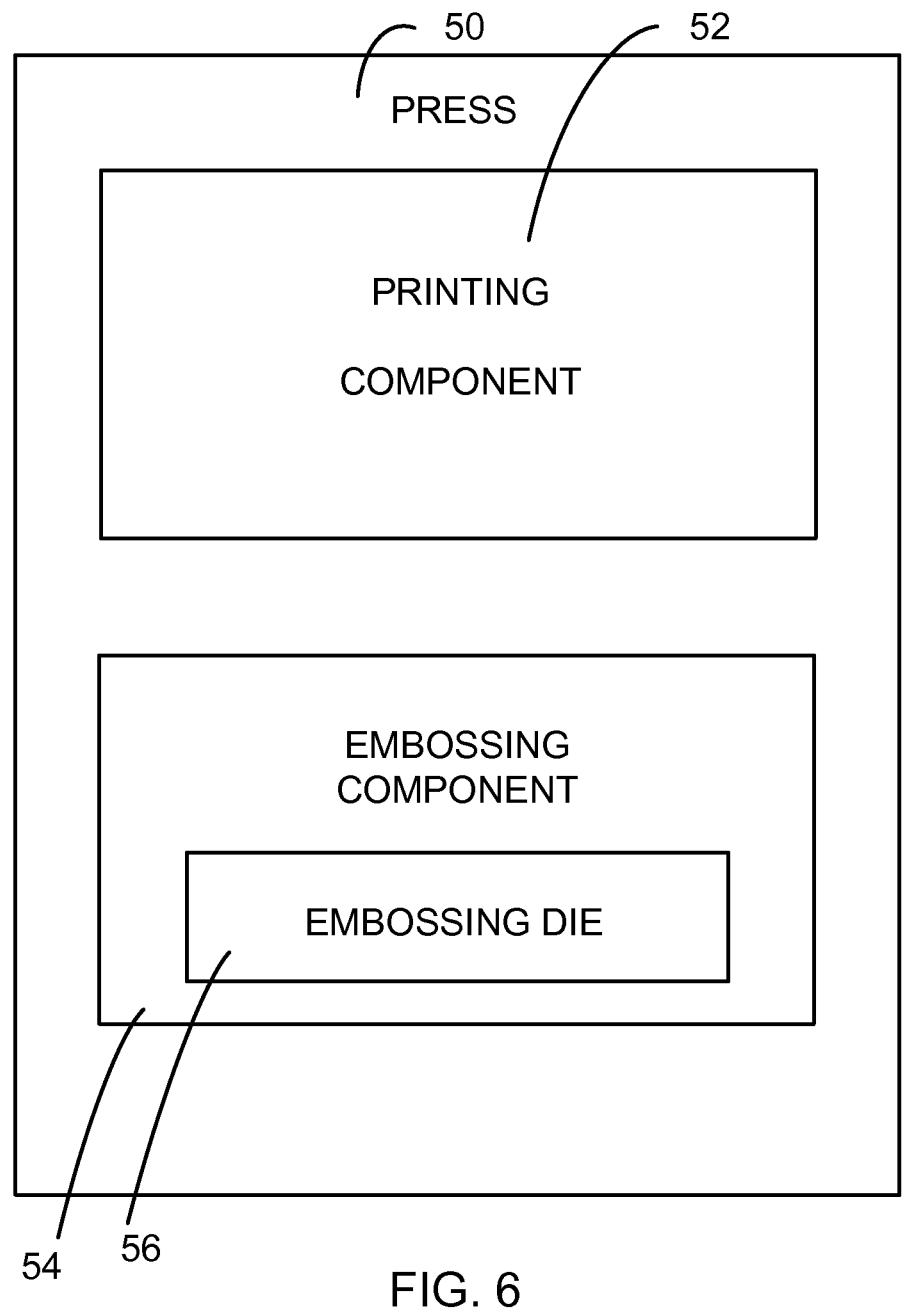
FIG. 6 is a block diagram of a press, according to an embodiment of the present invention.

Referring now to FIG. 6, a press 50 will be discussed. The press 50 may produce the cards 20 and/or paper 40 by printing an image 22 and embossing an impression 24. Additional operations may be performed by the press 50, such as separating cards 20 from the paper 40, cutting, laminating, or otherwise treating the cards 20. Skilled artisans will appreciate that such discussion to apply to other embodiments that may print directly to a card 20 or other media, without limitation. The press 50 can be a printing press with inline finishing capabilities that can include an embossing component (e.g., one or more embossing rollers) so that the impression 24 is embossed onto the card 20 and/or paper 40 during the manufacturing process.

The press 50 may include a printing component 52 and an embossing component 54. In the interest of clarity, the press 50 will be discussed as printing to paper 40. The press 50 and its components may include mechanical and/or electronic devices. In embodiments including electronic devices, the press 50, or a part of the press, may include a processor and memory. Instructions may be received by the processor from the memory to control at least part of the press 50. In an embodiment including mechanical devices, the press 50 may include, for example, one or more printing plate and/or embossing die 56. The mechanical parts may be applied to the paper 40 through mechanical action, which would be understood by a skilled artisan. Additionally, the press 50 may include a combination of mechanical and electrical parts.

At its most basic operation, the printing component 52 may print images 22 with text or graphics to paper 40. The printing component 52 may print an image 22 using various printing technologies, such as toner-based laser, inkjet, solid ink thermal transfer, dye-sublimation, thermal or ultraviolet inkless, typing, daisy wheel, dot-matrix, line, plotting, or other printing techniques. The printing component 52 may be connected to a computerized device with a processor and memory. The printing component 52 may receive instructions from the computerized device, which may indicate the image 22 to be printed, the place at which the image 22 should be printed, and other information relating to the printing of the image 22. The printing component 52 may be configured to print a plurality of images 22 on the paper 40.

The embossing component 54 may be used to emboss an impression 24 on the paper 40. Skilled artisans will appreciate that embossing is used generally herein to describe embossed impressions 24 with raised patterns and debossed impressions 24 with recessed patterns. The embossing component 54 may include an embossing die 56. The embossing die 56 may be formed of a material harder than the paper 40 receiving an impression 24, for example, copper or brass. In one embodiment, paper 40 may be positioned between a male and female embossing die 56, which may be fitted together to create the impression 24.

A pattern may be located on a surface of the embossing die 56, which may be pressed into the paper 40 to create the impression 24. The embossing die 56 may be variably positionable within the embossing component 54, such to allow an impression 24 to be made at desired place on the paper 40. In an embodiment, a plurality of embossing dies 56 may be included in the embossing component 54, such that one or more impressions 24 may be embossed into the paper 40.

The embossing component 54 may create the impression 24 by applying pressure to the paper 40. The embossing component 54 may additionally apply heat along with the pressure while making the impression 24. Application of heat along with pressure may help to reduce wrinkling that could occur during the embossing process.

The embossing component 54 may be located within the press 50 to receive a paper 40 shortly after being printed with an image 22 form the printing component 52. For example, the embossing component 54 may be located adjacent to the printing component 52 in the press 50, with the paper 40 output of the printing component 52 feeding into the input of the embossing component 54. By allowing this feeding between the components, the press 50 may advantageously print an image 22 and emboss an impression 24 in one approximately continuous operation. Additional embodiments may include configuring the press 50 to emboss an impression 24 prior to, or simultaneously with, printing an image 22.

In operation, as discussed briefly above, the system provides for the creation of a card 20 or paper 40 with an image 22 and an impression 24 that may be compared to determine a likelihood of authenticity and assist in the detection of forgeries. For clarity, the examples below may discuss the system in the context of creating a card 20. Skilled artisans should appreciate that the following examples are additionally applicable to printing papers 40 and other media, and should not view these examples as limiting in any way. Elements discussed along with following flowcharts correspond at least with the embodiments illustrated in FIGS. 1-6.

Figure 7:
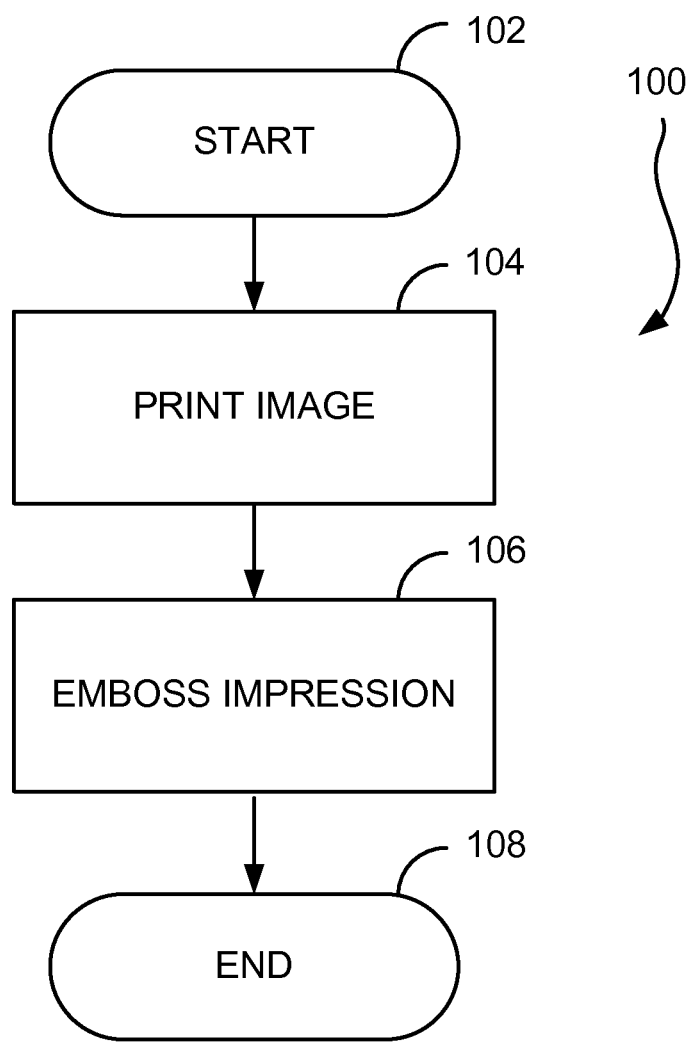
FIG. 7 is a flowchart illustrating an operation of creating a secured paper, according to an embodiment of the present invention.

The general operation of the system is illustrated by flowchart 100 of FIG. 7. Starting at Block 102, the system may print an image 22 to a card 20 (Block 104). The image 22 to be printed may be determined mechanically, for example using a printing plate. The image 22 to be printed may also be determined electronically, for example being received from a computerized device. The system may then emboss an impression 24 on the paper 40 (Block 106). As discussed above, the impression 24 may be made by one or more embossing dies 56 at a predetermined or variable place. Once the paper 40 has been printed and embossed, the operation may terminate (Block 108). Skill artisans will appreciate additional embodiments wherein an impression 24 may be embossed onto the card 20 prior to, or simultaneously with, printing an image 22.

Figure 8:
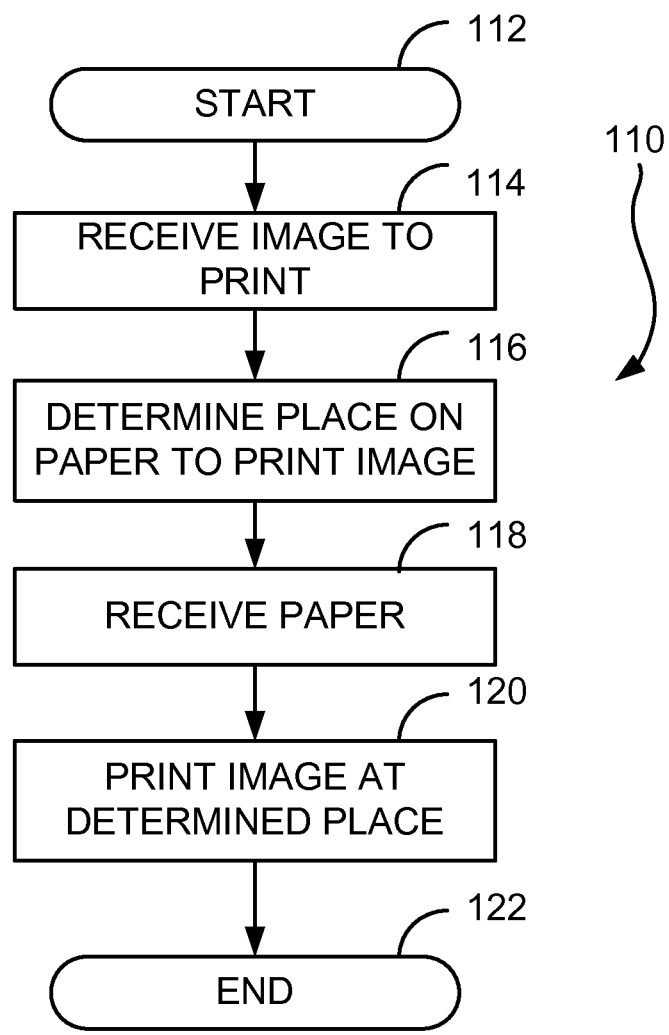
FIG. 8 is a flowchart illustrating an operation of printing an image to paper, according to an embodiment of the present invention.

Operation of the printing component 52 will now be discussed in greater detail along with flowchart 110 of FIG. 8. Starting at Block 112, the printing component 52 may receive the image 22 to be printed (Block 114). As discussed above, the image 22 may be received by the printing component 52 mechanically or electronically. If the image 22 is received electronically, data relating to the image 22 may be transferred from a computing device to the printing module. Data received by the printing module may be stored in a buffer until it is printed to paper 40.

The after receiving the image 22, the printing module may then determine a place on the paper 40 to print the image 22 (Block 116). The place may be manually or electronically controlled. If electronically controlled, the printing component 52 may receive data indicating the place the image 22 should be printed. The printing component 52 may then receive the paper 40 on which to print the image 22 (Block 118). Once the printing component 52 has received the image 22 to be printed, and determined the place to print the image 22, the print component may print the image 22 to the paper 40 (Block 120). The operation may then terminate at Block 122.

Figure 9:
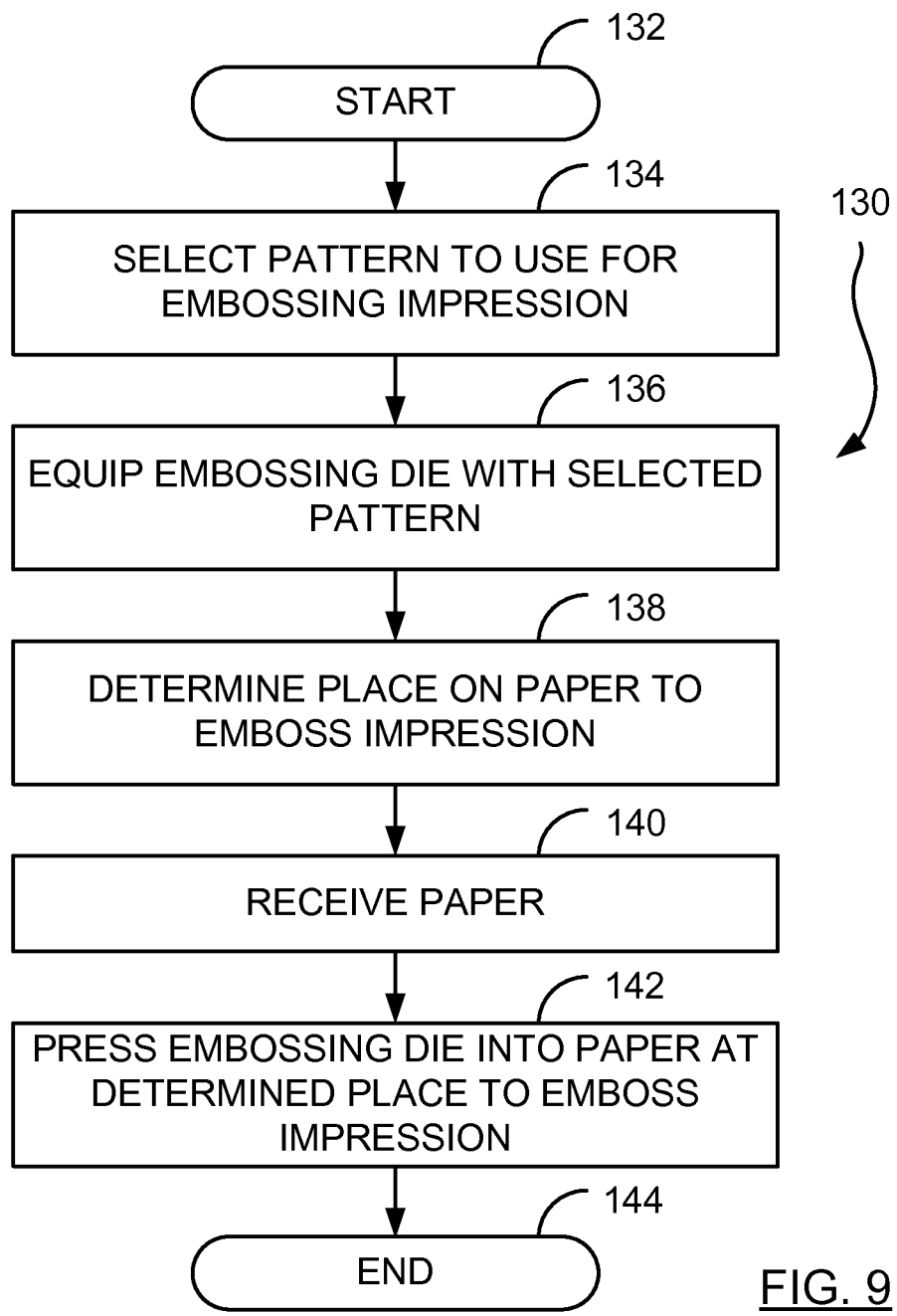
FIG. 9 is a flowchart illustrating an operation of embossing an impression on paper, according to an embodiment of the present invention.

Operation of the embossing component 54 will now be discussed in greater detail along with flowchart 130 of FIG. 9. Starting at Block 132, a pattern may be selected to be embossed into the paper 40 (Block 134). The pattern may be determined manually or electronically. Once the pattern has been selected, the embossing component 54 may select an embossing die 56 with the correct pattern to make the impression 24 (Block 136). The embossing die 56 may be selected mechanically. For example, a user may choose one or more embossing die 56 to be manually equipped in the embossing component 54. Alternatively, the embossing die 56 may be chosen electronically, for example, by receiving data from a computerized device that instructs the embossing component 54 to choose and/or equip an embossing die 56, which may be performed automatically.

Once the pattern and embossing die 56 have been chosen and equipped, the system may determine a place one the paper 40 to emboss the impression 24 (Block 138). The place may be manually or electronically controlled. If electronically controlled, the embossing component 54 may receive data indicating the place the impression 24 should be embossed. The embossing component 54 may then receive the paper 40 on which the impression 24 may be embossed (Block 140). The paper 40 may be received from the printing component 52. After the embossing die 56 and place have been determined, and the paper 40 has been received, the embossing component 54 may press the embossing die 56 into the paper 40 at the determined place to emboss the impression 24 (Block 142). The operation may then terminate (Block 144).

In an embodiment with multiple cards 20 on a paper 40, the design of the embossing pattern used to make the impression 24 may be varied so that each gift card 20 on the paper 40 may include impressions 24 with one or more different patterns. These different patterns may be provided by using a plurality of embossing die 56s in the embossing component 54, each with a desired pattern for a respective card 20. Additionally, the pattern of the impression 24 may be aligned to a place that matches a printed image 22. The combination of printed images 22 and embossed impressions 24 of various patterns, each of which may be located at various places on the card 20, advantageously increases the difficulty of forging the secured card 20.

Figure 10:
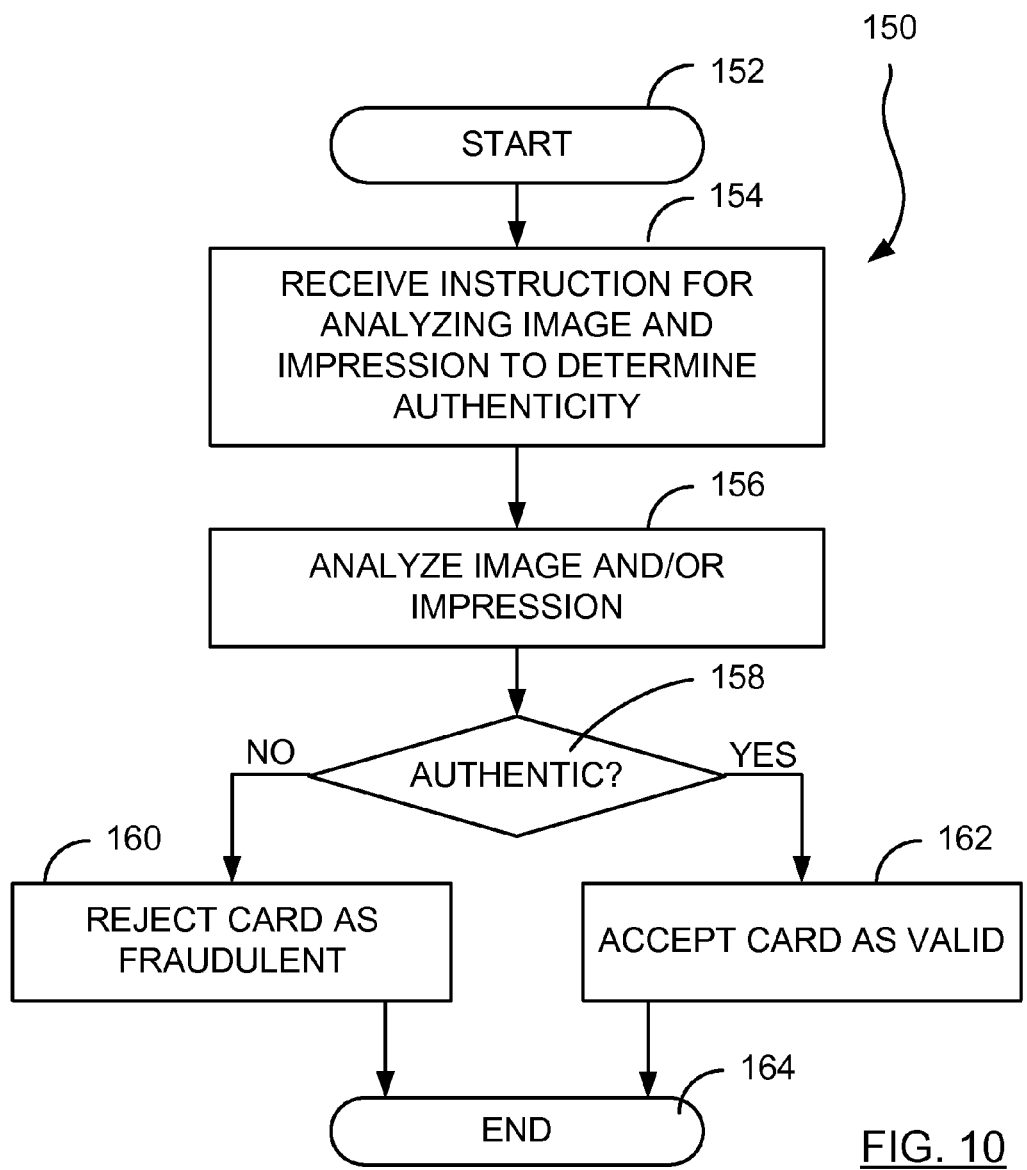
FIG. 10 is a flowchart of authenticating a paper printed with the system, according to an embodiment of the present invention.

Referring now to the operation shown in flowchart 150 of FIG. 10, an illustrative method of authenticating a secured card 20 will now be discussed. Skilled artisans will appreciate the following illustrative method may be used for authenticating a secured card 20, paper 40, document, or other media produced by the system of the present invention. Starting at Block 152, a user may receive instructions for analyzing a card 20, for example, comparing included images 22 with impressions 24, to determine authenticity of the card 20 (Block 154). The user may be a consumer, a merchant, or any other person that could interact with the card 20. The instructions may be included in the image 22 of the card 20, for example, by stating "the first four characters should be raised if authentic." Alternatively, the instructions may be provided by a document accompanying the card 20, a website, a training session, or any other forum to communicate information to a person.

Once the user has received the instruction, he or she may analyze the image 22 and/or the impression 24 (Block 156). More specifically, the user may analyze whether the image 22 and/or impression 24 is consistent with an authentic card 20. For example, the user may analyze whether the image 22 and the impression 24 are present and at a place consistent with the instructions. The user may compare a received card 20 with an expected impression 24 of an embossing pattern, since the impression 24 may not be easily replicated by a person. After the user has analyzed the card 20, he or she may determine whether the card 20 is authentic (Block 158). If it is determined at Block 158 that the card 20 is not authentic, the card 20 may be rejected as fraudulent (Block 160). Conversely, if it is determined at Block 158 that the card 20 is authentic, the card may be accepted as valid (Block 162). After the card 20 has been accepted or rejected, the operation may terminate at Block 164.

The above examples have been provided for illustrative purposes only. Discussions of analyzing a card 20 have been provided in the interest of clarity, and are not intended to limit the present invention to applying only to a card 20. Similarly, discussion about an operation being performed by a user is not intended to exclude those operations from being performed by a system, computerized device, machine, or other automated process.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for securing paper comprising:
a printing component to print an image on the paper, the image being configurable; and
an embossing component configurable with a pattern to emboss an impression on the paper, the pattern being provided by an embossing die;
wherein the impression is correlative with the image comprising a code to indicate a likelihood of authenticity;
wherein the impression is comparable with the image to determine the likelihood of authenticity;
wherein the paper is receivable by the embossing component from the printing component.

2. The system of claim 1, wherein the printing component and the embossing component are includable in a press to print the image and emboss the impression in an approximately continuous operation.

3. The system of claim 1, wherein the embossing component is configurable to vary a position where the impression is embossed on the paper.

4. The system of claim 3, wherein the image and the impression are adjacently locatable at a place on the paper.

5. The system of claim 1, wherein the paper comprises a card, the impression being locatable at least partially on the card, and the image being locatable at least partially on the card.

6. The system of claim 5, wherein the image comprises a code corresponding with a value usable with a merchant in commerce.

7. The system of claim 1, wherein the paper comprises a plurality of cards, the image being includable on each card of the plurality of cards, and the impression being includable on each card of the plurality of cards.

8. The system of claim 7, wherein the pattern of the impression is configurable to differ among each card on the paper, the impression being locatable on each card.

9. The of claim 1, wherein the embossing component comprises an embossing roller.

10. A system for securing a card comprising:
a printing component to print an image on a card, the image being configurable to comprise a unique identifier corresponding with a value usable with a merchant; and
an embossing component configurable with a pattern to emboss an impression on the card, the pattern being provided by an embossing die;
wherein the impression is correlative with the image to indicate a likelihood of authenticity;
wherein the impression is comparable with the image to determine the likelihood of authenticity;
wherein the image comprises a code corresponding with a value usable with a merchant in commerce;
wherein the paper is receivable by the embossing component from the printing component.

11. The system of claim 10, wherein the printing component and the embossing component are includable in a press to print the image and emboss the impression in an approximately continuous operation.

12. The system of claim 10, wherein the embossing component is configurable to vary a place the impression is embossed on the card.

13. The system of claim 10, wherein the card is comprised of paper, and wherein the impression is locatable at least partially on the card.

14. The system of claim 13, wherein additional cards are includable on the paper, the image being includable on the at least one of the additional cards, and the impression being includable on at least one of the additional cards.

15. The system of claim 14, wherein the impression is selectable to differ between the card and at least one of the additional cards, and wherein the image is selectable to differ between the card and at least one of the additional cards.

16. The system of claim 10, wherein the embossing component comprises an embossing roller.

17. A method for securing paper using a system with a printing component and an embossing component comprising the steps of:
(a) printing a configurable image to a paper, a unique identifier being includable in the image corresponding with a value usable with a merchant in commerce; and (b) embossing an impression of a configurable pattern from an embossing die to the paper, the impression being correlative with the image to indicate a likeliness of authenticity;

wherein the impression is comparable with the image to determine the likelihood of authenticity;

wherein the paper is receivable by the embossing component from the printing component.

18. The method of claim 17, wherein the printing component and the embossing component are included in a press to print the image and emboss the impression in one significantly continuous operation.

19. The method of claim 17, further comprising selecting a place on the paper to make the impression and the image, the impression being positionable approximately adjacent to the image.

20. The method of claim 19, wherein the paper comprises a card, wherein the impression and the image are locatable at least partially on the card.

21. The method of claim 20, wherein additional cards are includable on the paper, the image being includable on the at least one of the additional cards, and the impression being includable on at least one of the additional cards.

22. The method of claim 21, wherein the impression is selectable to differ between the card and at least one of the additional cards, and wherein the image is selectable to differ between the card and at least one of the additional cards.

23. The method of claim 17, wherein the embossing component comprises an embossing roller.

* * * * *